United States Patent
Szivacz et al.

(10) Patent No.: US 8,828,120 B2
(45) Date of Patent: Sep. 9, 2014

(54) DEVICE AND METHOD FOR SEPARATING A GAS MIXTURE

(75) Inventors: Johannes Szivacz, Weigelsdorf (AT); Michael Harasek, Vienna (AT)

(73) Assignee: Axiom Angewandte Prozesstechnik Ges. m.b.H., Deutsch Brodersdorf (AT)

( * ) Notice: Subject to any disclaimer, the term of this patent is extended or adjusted under 35 U.S.C. 154(b) by 158 days.

(21) Appl. No.: 13/377,231

(22) PCT Filed: Apr. 16, 2010

(86) PCT No.: PCT/AT2010/000117
§ 371 (c)(1),
(2), (4) Date: Jan. 12, 2012

(87) PCT Pub. No.: WO2010/141963
PCT Pub. Date: Dec. 16, 2010

(65) Prior Publication Data
US 2012/0111052 A1 May 10, 2012

(30) Foreign Application Priority Data
Jun. 10, 2009 (AT) .................. A 900/2009

(51) Int. Cl.
*B01D 53/22* (2006.01)
*C10L 3/10* (2006.01)

(52) U.S. Cl.
CPC ............. *C10L 3/10* (2013.01); *B01D 2257/504* (2013.01); *B01D 2256/24* (2013.01); *Y02C 10/10* (2013.01); *B01D 53/226* (2013.01)
USPC ................... 95/45; 95/43; 95/51; 96/4; 96/7; 96/11; 96/12; 96/9

(58) Field of Classification Search
USPC ................ 95/43, 45, 51; 96/4, 7, 9, 11, 12
See application file for complete search history.

(56) References Cited

U.S. PATENT DOCUMENTS

| 3,208,197 A | 9/1965 | Simon et al. |
| 4,130,403 A | 12/1978 | Cooley et al. |

(Continued)

FOREIGN PATENT DOCUMENTS

| DE | 10 2004 007 548 | 9/2005 |
| EP | 0 110 858 | 6/1984 |

(Continued)

OTHER PUBLICATIONS

International Search Report of PCT/AT2010/000117, date of mailing Aug. 18, 2010.

(Continued)

*Primary Examiner* — Jason M Greene
*Assistant Examiner* — Anthony Shumate
(74) *Attorney, Agent, or Firm* — Collard & Roe, P.C.

(57) ABSTRACT

A device for separating a gas mixture into product gas and offgas by way of gas permeation includes four membrane units and a compressor connected upstream of the first membrane unit. The membrane units have a gas inlet, a retentate outlet and a permeate outlet. Lines connect the membrane units to each other and to the compressor. Product gas is obtained via the permeate outlet of the second membrane unit and offgas via the retentate outlet of the first membrane unit. Additional product gas is obtained via the retentate outlet of an upstream membrane unit and additional offgas is obtained via the permeate outlet of a further upstream membrane unit. A method includes use of the device to separate a gas mixture into product gas and offgas.

9 Claims, 2 Drawing Sheets

(56) References Cited

U.S. PATENT DOCUMENTS

| | | | |
|---|---|---|---|
| 4,264,338 A * | 4/1981 | Null | 95/47 |
| 4,994,094 A | 2/1991 | Behling et al. | |
| 5,032,148 A | 7/1991 | Baker et al. | |
| 5,064,446 A | 11/1991 | Kusuki et al. | |
| 5,089,033 A * | 2/1992 | Wijmans | 95/39 |
| 5,281,253 A * | 1/1994 | Thompson | 95/22 |
| 5,851,266 A * | 12/1998 | Prasad et al. | 95/54 |
| 6,572,678 B1 | 6/2003 | Wijmans et al. | |
| 6,572,679 B2 * | 6/2003 | Baker et al. | 95/47 |
| 7,537,641 B2 * | 5/2009 | Lokhandwala et al. | 95/45 |
| 8,394,182 B2 * | 3/2013 | Koros et al. | 96/10 |
| 8,419,827 B2 * | 4/2013 | Repasky et al. | 95/45 |
| 8,444,749 B2 * | 5/2013 | Sanders et al. | 95/45 |
| 8,512,441 B2 * | 8/2013 | Nel et al. | 95/48 |
| 2010/0313750 A1 * | 12/2010 | Sanders et al. | 95/39 |
| 2011/0305310 A1 | 12/2011 | Sanchez et al. | |

FOREIGN PATENT DOCUMENTS

| | | |
|---|---|---|
| EP | 0 329 962 | 8/1989 |
| FR | 2 917 305 | 12/2008 |
| GB | 2 005 152 | 4/1979 |
| WO | WO 99/06137 | 2/1999 |

OTHER PUBLICATIONS

Agrawal R. et al, Gas separation membrane cascades II. Two-compressor cascades, Journal of Membrane Science, Apr. 1996, pp. 129-146 (ISR) (Written Opinion).

International Preliminary Report on Patentability and Written Opinion o f International Searching Authority of PCT/AT2010/000117, Dec. 22, 2011.

* cited by examiner

DEVICE AND METHOD FOR SEPARATING A GAS MIXTURE

CROSS REFERENCE TO RELATED APPLICATIONS

This application is the National Stage of PCT/AT2010/000117 filed on Apr. 16, 2010, which claims priority under 35 U.S.C. §119 of Austrian Application No. A 900/2009 filed on Jun. 10, 2009. The international application under PCT article 21(2) was not published in English.

The present invention relates to a device and method for separating a gas mixture into product gas and offgas by way of gas permeation.

In gas permeation membrane units, the product gas and offgas are separated by way of permeation, wherein a product gas-enriched retentate and an offgas-enriched permeate can be obtained, for example. The concentrations of product gas in the retentate and offgas in the permeate depend on the respective used process parameters, wherein an elevated energy input (higher pressure, lower yield relative to used feed gas, etc.) is generally always required for an elevated product gas quality. Therefore, it is desirable to have improved methods for increasing product gas yield or more efficiently using energy during such a process. It is also desirable to keep the investment costs incurred while setting up such a gas permeation system as low as possible.

Devices for separating a gas mixture into product gas and offgas by way of gas permeation have previously been set up in such a way as to separate the pressurized feed gas into the retentate and permeate in a membrane unit, wherein the retentate contains the product gas, and the permeate contains the offgas, for example. The disadvantage to this one-stage solution has to do with low product gas quality and low product gas yield, which are associated with an elevated energy requirement. In addition, this device can only be used economically for very selective membranes.

Improved devices for separating a gas mixture into product gas and offgas by way of gas permeation are set up in such a way that the pressurized permeate of a first membrane unit is used as a feed gas for a second membrane unit, wherein the retentate streams of the two membrane units contain the product gas, and the permeate stream of the second membrane unit contains the offgas. If necessary, the system can also exhibit an upstream compressor if the feed gas present has not been pressurized. The advantage to this device is an improved product gas yield. The disadvantages to this solution are the continued low product gas quality and an elevated energy requirement due to the necessary compression of the gas for the second membrane unit. In addition, these devices can only be used economically for very selective membranes.

Also known are devices in which the retentate of a first membrane unit is used as the feed gas of a second membrane unit, the permeate of the second membrane unit is mixed in with the pressurized feed gas of the first membrane unit, the retentate of the second membrane unit is removed as the product gas, and the permeate of the first membrane is removed as the offgas. Since the permeate of the second membrane unit is here circulated in a sense, the dimensions of the system and all necessary parts (compressors, lines, membrane units, cold separators, vane-type sulfur separators, etc.) must be increased to reflect the volumetric flow of the circulated permeate of the first membrane unit. Assuming a volumetric flow of feed gas measuring $100\ m^3/h$, and admixing 80 $m^3/h$ of permeate of the second membrane unit to this feed gas, an overall volumetric flow of $180\ m^3/h$ arises before the compressor, based upon which the system must be dimensioned. The advantage to this method is that a higher yield of product gas can be achieved, and the two-stage embodiment makes it possible to use less selective membranes, while the disadvantage here involves the oversized layout of the system by a factor of 1.2 to 2.5, and the elevated energy requirement owing to recirculation.

Therefore, the object of the present invention is to provide a device and method for separating a gas mixture into product gas and offgas by way of gas permeation, which enables an elevated product gas yield and/or more efficient energy utilization.

The invention here proceeds from a device for separating a gas mixture into product gas and offgas by way of gas permeation with at least two membrane units (1) and (2) and a compressor (3) placed upstream from the first membrane unit (1), with the membrane units (1) and (2) exhibiting a gas inlet (1a, 2a), a retentate outlet (1b, 2b) and a permeate outlet (1c, 2c), wherein the retentate outlet (1b) of the first membrane unit (1) is connected to the gas inlet (2a) of the second membrane unit (2), the permeate outlet (2c) of the second membrane unit (2) is connected on the intake side with the condenser (3) or the gas supply leading into the condenser, and the condenser (3) is connected with the gas inlet (1a) of the first membrane unit (1), all by way of lines, product gas is obtained via the retentate outlet (2b), and offgas is obtained via the permeate outlet (1c).

In such a device, the invention provides that the permeate outlet (4c) of an upstream membrane unit (4) is connected with the gas supply of the compressor (3) by way of a line, wherein at least one other membrane unit (5) is placed upstream from the membrane unit (4) by connecting the retentate outlet (5b) of the additional membrane unit (5) with the gas inlet (4a) of the membrane unit (4) by way of a line, and additional product gas is obtained via the retentate outlet (4b), and additional offgas is obtained via the permeate outlet (5c). Such a device makes it possible to design the first two membrane units (5, 6) on the feed side smaller than in prior art, so that it is less expensive to change out the latter two membrane units, which experience has shown become contaminated the soonest. The other two membrane units (1, 2) have a virtually unlimited service life, since all contaminants have already been eliminated. It is here favorable for the retentate outlet (4b) of the membrane unit (4) to be connected with the retentate outlet (2b) of the membrane unit (2) by way of a line so as to jointly remove product gas. Combining the two product gas lines here brings with it system-related advantages, because only one product gas line needs to be routed to the outside, and, for example, only one product gas stream must be analyzed for quality control purposes.

It is also favorable for the permeate outlet (5c) of the membrane unit (5) to be connected with the permeate outlet (1c) of the membrane unit (1) by way of a line so as to jointly remove offgas. Combining the two offgas lines also brings with it system-related advantages, because only one offgas line needs to be routed to the outside.

In a preferred embodiment, a compressor is also placed upstream from the gas inlet (5a) of the membrane unit (5). Providing another compressor (e.g., when the feed gas is not pressurized and ready) enables a continuous volumetric flow, and secures the required pressurization of the feed gas.

One especially preferred embodiment of the present invention provides that the two membrane units (1) and (2) as well as the two membrane units (4) and (5) each be formed by a membrane unit (6) or (7) with a gas inlet (6a) or (7a), a retentate outlet (6b) or (7b) and two permeate outlets (6c, 6c') or (7c, 7c'), wherein the permeate outlet (6c') of the membrane unit (6) is connected on the intake side with the compressor (3) or the gas supply leading into the compressor, and the compressor (3) is connected with the gas inlet (6a) of the membrane unit (6), all by way of lines, product gas is obtained via the retentate outlet (6b), offgas is obtained via the permeate outlet (6c), the gas supply of the compressor (3) is connected with the permeate outlet (7c') of the upstream membrane unit (7) by way of a line, additional product gas is obtained via the retentate outlet (7b), and additional offgas is obtained via the permeate outlet (7c). This arrangement makes it possible to provide several (at least two) separation stages in each membrane unit, while at the same time reducing the number of line connections, and thereby diminishing cost-intensive investments inside the device.

The invention here further provides that the permeate spaces of the membrane units (6) and (7) each be separated in the region between the permeate outlets (6c, 6c') and (7c, 6c') by a wall (6d) and (7d). The separation here prevents the two permeate streams (which exhibit varying concentrations of offgas and product gas) from getting mixed together again before exiting the respective permeate outlets. In addition, these separations make it possible to divide the permeate spaces in whatever ratio desired, so the desired membrane surfaces can be allocated to whatever individual permeate spaces desired. Even repeatedly dividing the permeate spaces is conceivable, wherein the composition of the two offgas streams can be influenced in terms of their concentrations of offgas and product gas by selectively combining the different permeate steams.

It is here favorable for the retentate outlet (7b) of the membrane unit (7) to be connected with the retentate outlet (6b) of the membrane unit (6) by way of a line so as to jointly remove product gas. Here as well, combining the two product gas lines brings with it system-related advantages, because only one product gas line needs to be routed to the outside, and, for example, only one product gas stream must be analyzed for quality control purposes.

A compressor is preferably also placed upstream from the gas inlet (7a) of the membrane unit (7). Providing another compressor (e.g., when the feed gas is not pressurized and ready) enables a continuous volumetric flow, and secures the required pressurization of the feed gas.

Another aspect of the present invention involves using the mentioned device for separating a gas mixture consisting primarily of $CH_4/CO_2$ into $CH_4$ as the product gas and $CO_2$ as the offgas.

Yet another aspect of the present invention relates to a method for separating a gas mixture into product gas and offgas by way of gas permeation, wherein the retentate of a first membrane unit (1) is used as the feed gas of a second membrane unit (2), the permeate of the second membrane unit (2) is mixed with the pressurized feed gas of the first membrane unit (1), the retentate of the second membrane unit (2) is removed as the product gas, and the permeate of the first membrane unit (1) is removed as the offgas, wherein the invention provides that the permeate of an upstream membrane unit (4) is used as the feed gas of the first membrane unit (1), for which the retentate of another upstream membrane unit (5) is used as the feed gas, wherein the retentate of the membrane unit (4) is obtained as the additional product gas, and the permeate of the membrane unit (5) is obtained as the additional offgas.

It is here favorable for the retentate of the membrane units (2) and (4) be jointly removed as the product gas.

It is also preferred for the permeate of the membrane units (1) and (5) to be jointly removed as the offgas.

It is further favorable for the feed gas of the membrane unit (5) to also be pressurized.

A respective membrane unit (6) or (7) with two permeate outlets (6c, 6c') or (7c, 7c') are advantageously used as the two membrane units (1) and (2) as well as the two membrane units (4) and (5), wherein the one of the two permeates with more product gas or less offgas in the membrane unit (6) is pressurized and circulated, while the other of the two permeates with more product gas or less offgas in membrane unit (7) is used as a feed gas for the membrane unit (6), wherein product gas is obtained as the retentate of the membrane units (6) and (7), and offgas is obtained as the other permeate of the membrane units (6) and (7).

It is here favorable for the retentate of the membrane units (6) and (7) to be jointly removed as the product gas.

The one of the two permeates with more offgas or less product gas in the membrane units (6) and (7) is preferably jointly removed as offgas.

It is further favorable for the feed gas of the membrane unit (7) to also be pressurized. The advantages to these embodiments of the method according to the invention were already explained during the respective description of the accompanying device.

In one last aspect of the present invention, the method according to the invention is used to separate a gas mixture consisting primarily of $CH_4/CO_2$ into $CH_4$ as the product gas and $CO_2$ as the offgas.

The present invention will now be elucidated in more detail drawing reference to the attached figures. Shown on:

Figure 1:
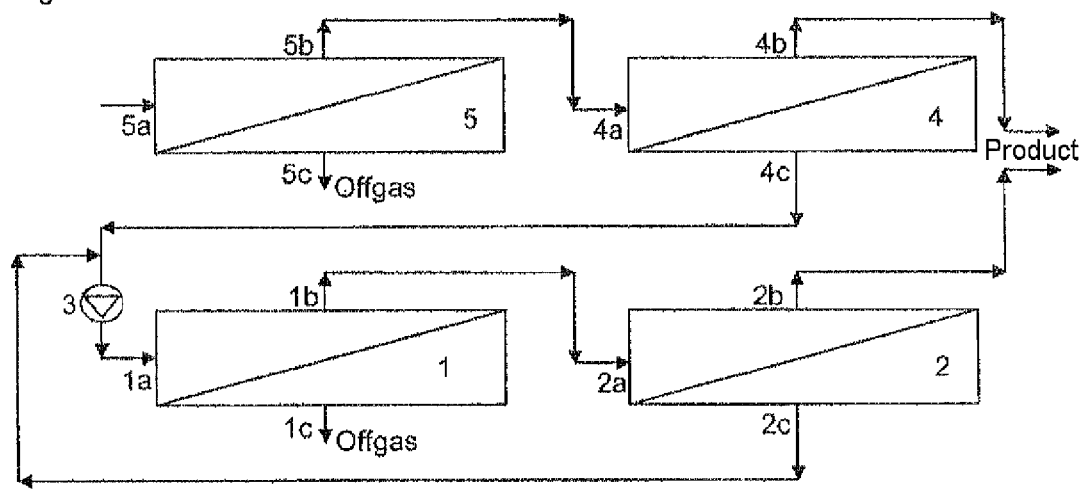
FIG. 1 is a block diagram of a device according to the invention with two membrane units (1) and (2), a compactor or compressor (3) placed upstream from the first membrane unit (1), and two additional membrane units (4) and (5)

All membrane units exhibit a gas inlet (1a, 2a, 4a, 5a), a retentate outlet (1b, 2b, 4b, 5b) and a permeate outlet (1c, 2c, 4c, 5c), wherein the retentate outlet (1b) of the first membrane unit (1) is connected with the gas inlet (2a) of the second membrane unit (2). Since product gas is here obtained as the retentate, it means that the membrane unit (1) introduces product gas into the membrane unit (2) as feed gas for further cleaning. Offgas gathering in the membrane unit (2) is then relayed to the compressor (3) or the gas supply leading into the compressor on the intake side by way of the permeate outlet (2c), thereby circulating the offgas separated by way of the compressor (3), gas inlet (1a), retentate outlet (1b), gas inlet (2a) and permeate outlet (2c) in the second membrane unit (2). While this increases the volumetric flow in the membrane units (1) and (2), the compressor (3) is supplied with permeate from the permeate outlet (4c) of an upstream membrane unit (4), as opposed to prior art, wherein at least one additional membrane unit (5) is placed upstream from the membrane unit (4) in such a way as to connect the retentate outlet (5b) with the gas inlet (4a).

In the process, product gas is here accumulated and discharged via the retentate outlets (2b) and (4b), and offgas via the permeate outlets (1c) and (5c).

Figure 3:
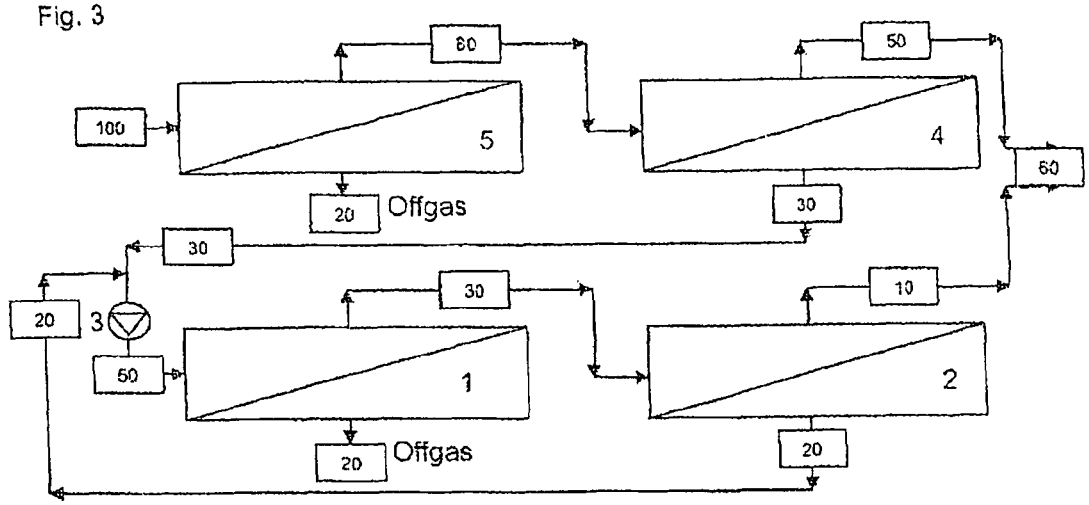
FIG. 3 is a volumetric flow balance sheet for the device according to FIG. 1.
Figure 4:
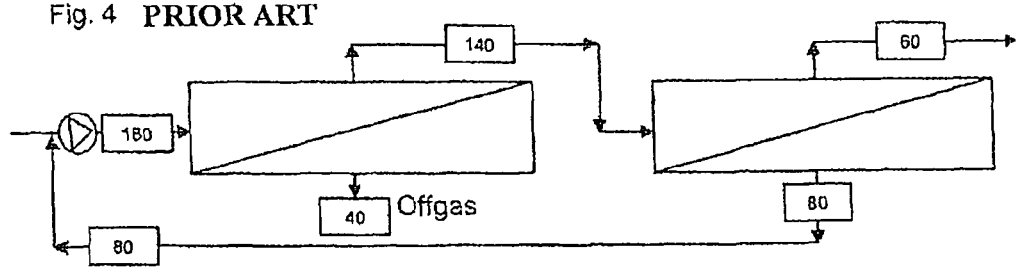
FIGS. 4 and 5 are volumetric flow balance sheets for the devices according to prior art.
Figure 5:
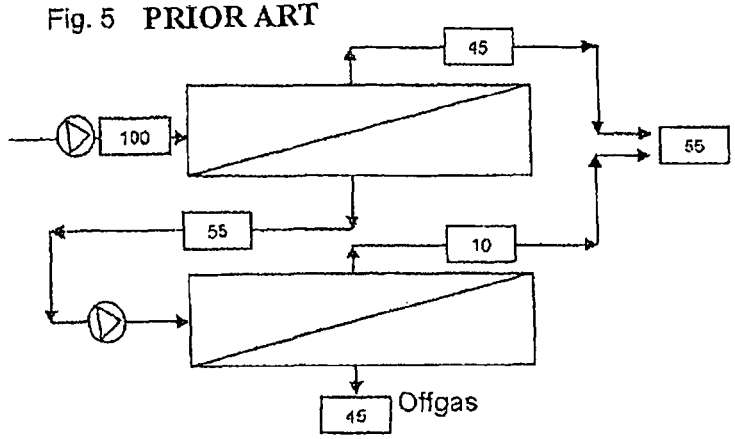

As evident from an analysis of the volumetric flow balance sheet for such an embodiment according to the invention (FIG. 3), a total of 60 $m^3$/h of product gas and 40 $m^3$/h of offgas can be obtained at an assumed inflow of 100 $m^3$/h, while methods in prior art yield 60 $m^3$/h of product gas and 40 m³/h of offgas (FIG. 4) or 55 m³/h of product gas and 45 m³/h of offgas (FIG. 5). In comparison to the prior art according to FIG. 4, this further means that the membrane units (5) and (4) can be rated for a product stream of 100 m³/h or 80 m³/h in the method according to the invention, while the membrane units (1) and (2) generally must be dimensioned just for 50 m³/h or 30 m³/h. By contrast, the membrane units (along with all other system parts not depicted, such as lines, membrane units, cold separators, vane-type sulfur separators, etc.) on FIG. 4 must be dimensioned for 180 m³/h or 140 m³/h. As a consequence, it is clearly evident that placing at least two membrane units upstream makes it possible to implement the method in prior art with significantly smaller dimensions at identical yields.

Figure 2:
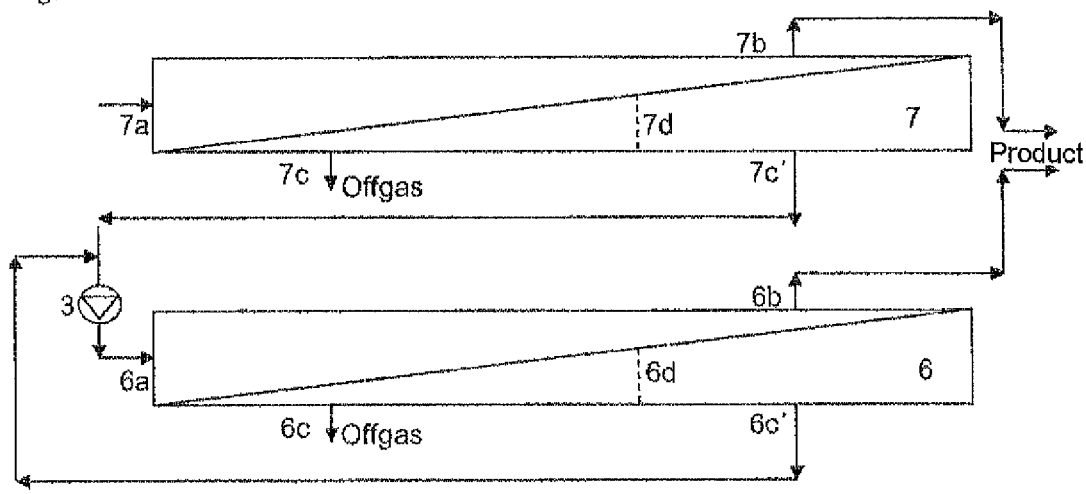
FIG. 2 is a block diagram of a device according to the invention with two membrane units (6 and 7), a compressor (3) placed upstream from the membrane unit (6), wherein each membrane unit exhibits two permeate outlets.

FIG. 2 shows another embodiment according to the invention, wherein the two membrane units (1) and (2) were replaced by a membrane unit (6) or (7) with two permeate outlets (6c, 6c') or (7c, 7c'). In addition, the membrane units (6, 7) each exhibit a gas inlet (6a, 7a), a retentate outlet (6b, 7b), and if necessary a separating wall (6d, 7d) in the permeate space, so as to separate permeate streams of varying concentration.

The invention claimed is:

1. A device for separating a gas mixture into product gas and offgas by way of gas permeation, the device comprising
    a first membrane unit comprising a gas inlet, a retentate outlet, and a permeate outlet,
    a second membrane unit comprising a gas inlet, a retentate outlet, and a permeate outlet,
    a first compressor placed upstream from the first membrane unit and comprising an intake side,
    an upstream membrane unit comprising a gas inlet, a retentate outlet, and a permeate outlet, and
    at least one other membrane unit comprising a gas inlet, a retentate outlet and a permeate outlet and disposed upstream from the upstream membrane unit,
    a first line connecting the retentate outlet of the first membrane unit to the gas inlet of the second membrane unit,
    a second line connecting the permeate outlet of the second membrane unit on the intake side with the first compressor or with a gas supply leading into the first compressor,
    a third line connecting the first compressor with the gas inlet of the first membrane unit,
    a fourth line connecting the permeate outlet of the upstream membrane unit with the gas supply of the first compressor, and
    a fifth line connecting the retentate outlet of the at least one other membrane unit with the gas inlet of the upstream membrane unit,
    wherein the product gas is obtained via the retentate outlet of the second membrane unit,
    wherein the offgas is obtained via the permeate outlet of the first membrane unit,
    wherein additional product gas is obtained via the retentate outlet of the upstream membrane unit, and
    wherein additional offgas is obtained via the permeate outlet of the at least one other membrane unit.

2. The device according to claim 1, further comprising a sixth line connecting the retentate outlet of the upstream membrane unit with the retentate outlet of the second membrane unit so that the product gas is jointly removed from the second membrane unit and from the upstream membrane unit.

3. The device according to claim 1, further comprising a sixth line connecting the permeate outlet of the at least one other membrane unit with the permeate outlet of the first membrane unit so that the offgas is jointly removed from the first membrane unit and from the at least one other membrane unit.

4. The device according to claim 1, wherein, and
    wherein the device further comprises a second compressor placed upstream from the gas inlet of the at least one other membrane unit.

5. A method for separating a gas mixture into product gas and offgas by way of gas permeation, the method comprising steps of
    using retentate of a first membrane unit as feed gas of a second membrane unit,
    mixing permeate of the second membrane unit with pressurized feed gas of the first membrane unit,
    removing retentate of the second membrane unit as the product gas,
    removing permeate of the first membrane unit as the offgas,
    using permeate of an upstream membrane unit as feed gas of the first membrane unit,
    using retentate of an additional upstream membrane unit as feed gas of the upstream membrane unit,
    obtaining retentate of the upstream membrane unit as additional product gas, and
    obtaining permeate of the additional upstream membrane unit as additional offgas.

6. The method according to claim 5, wherein the gas mixture comprises $CH_4/CO_2$,
    wherein $CH_4$ is the product gas, and
    wherein $CO_2$ is the offgas.

7. The method according to claim 5, wherein the retentate of the second membrane unit and the retentate of the upstream membrane unit are jointly removed as the product gas.

8. The method according to claim 5, wherein the permeate of the first membrane unit and the permeate of the additional upstream membrane unit are jointly removed as the offgas.

9. The method according to claim 5, wherein feed gas of the additional upstream membrane unit is pressurized.

* * * * *